(No Model.)

D. J. FIELD.
COFFEE POT.

No. 596,965. Patented Jan. 4, 1898.

Witnesses:
J. W. Garfield
K. J. Clemons

Inventor,
David J. Field,
by Chapin & Co.
Attorneys.

United States Patent Office.

DAVID J. FIELD, OF NORTHAMPTON, MASSACHUSETTS, ASSIGNOR OF ONE-HALF TO EDWIN O. FELTON, OF SAME PLACE.

COFFEE-POT.

SPECIFICATION forming part of Letters Patent No. 596,965, dated January 4, 1898.

Application filed May 3, 1897. Serial No. 634,794. (No model.)

*To all whom it may concern:*

Be it known that I, DAVID J. FIELD, a citizen of the United States of America, residing at Northampton, in the county of Hampshire and State of Massachusetts, have invented new and useful Improvements in Coffee-Pots, of which the following is a specification.

This invention relates to coffee or tea pots, and has for its object the construction of a utensil of this class in which is provided improved means for condensing the vapors or steam arising from the steaming or boiling of the water in the body of the pot and into which coffee or tea has been put, whereby said steam will be condensed and in its condensed form will be returned to the liquid in the bottom of the coffee-pot, thereby preventing its escape from the latter in the form of vapor; and the invention consists in the construction as hereinafter specified and claimed.

Figure 1:
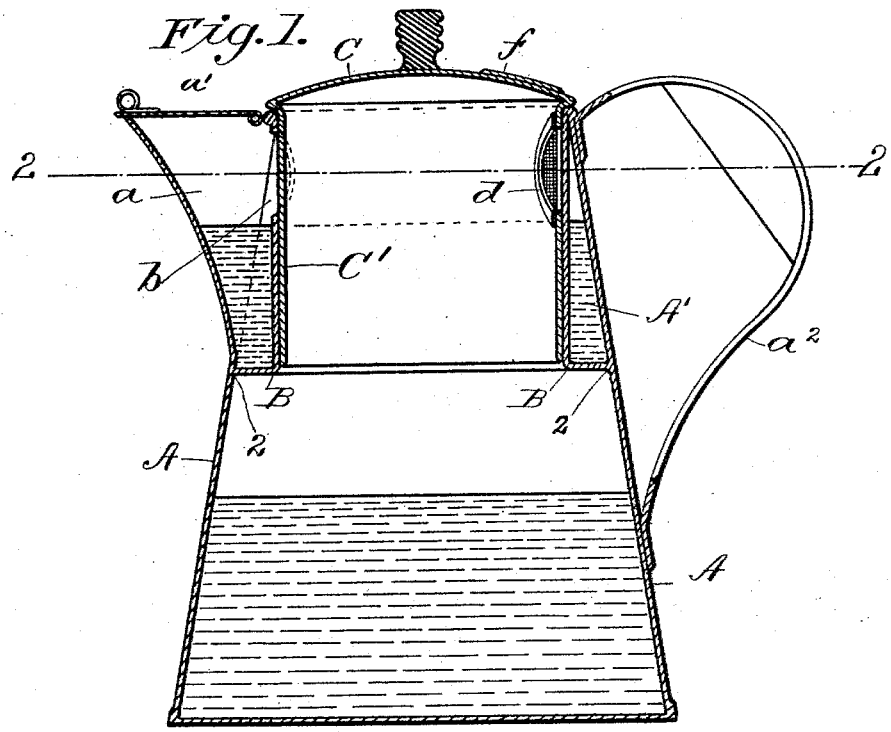
Figure 2:
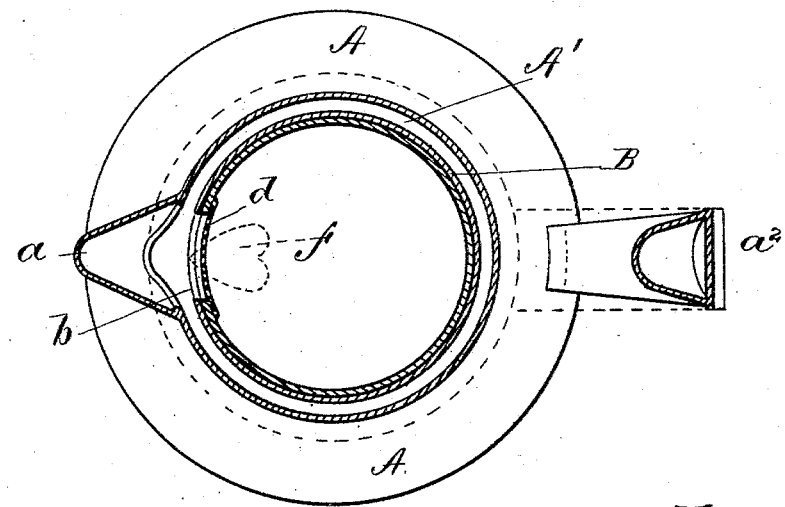

Referring to the drawings forming part of this specification, Figure 1 is a sectional elevation of a tea or coffee pot constructed according to my invention. Fig. 2 is a cross-section on line 2 2, Fig. 1.

In the drawings, A represents a coffee or tea pot of ordinary construction to which my invention is applied. Said pot is provided with a spout $a$, a cover $a'$ therefor, and with a handle $a^2$.

Inside of the body of the pot and extending from the top downward is an annular chamber $A'$, formed by the wall or partition B. Said wall or partition is soldered to the inner surface of the pot at 2 and extends at right angles therefrom to such a point as will permit the vertical portion thereof to be made of a cylindrical form having an interior diameter equal to the diameter of the top of the body of the pot, which is in this case tapered from the bottom upward. This particular form of the annular chamber is incidental to the application thereof to a pot having an upwardly-tapering body, but can be applied equally well to other forms, it being only necessary that the internal diameter of the chamber $A'$ should have a vertical wall B for the reception of a cover C, provided with a deep cylindrical rim $C'$, which should extend down nearly to the lowest part of the chamber $A'$, as shown in Fig. 1. Said chamber $A'$ constitutes a condensing-chamber and is partially filled with cold water when the tea or coffee and hot water are put into the body of the pot for cooking.

An opening $b$ is made through the wall B of the chamber $A'$ opposite the spout $a$, which opening is closed against the escape of steam from the body of the pot by the rim $C'$ of the cover which fits closely against the said wall B. In the rim $C'$ of the cover an opening $d$ is made, which is covered with wire-gauze which serves as a strainer for the contents of the pot, and the position of said opening is indicated by a mark of some kind on the top of the cover C. In this instance a heart-shaped piece of metal $f$ is soldered on the said cover for that purpose. While the coffee or tea is cooking or steeping the cover is so placed in the top of the pot that the said openings $b$ and $d$ will not register with one another; but when it is desired to pour out the tea or coffee the cover is rotated to bring the indicator $f$ on the cover in line centrally with the spout $a$, which brings the strainer-opening $d$ to a point where it will register with the opening $b$, whereby a direct passage is opened from the interior of the pot to the spout.

By making the rim $C'$ of the cover C fit loosely the wall B of the condensing-chamber any steam formed by the cooking of the contents of the coffee-pot must pass up between the said wall B and rim $C'$, where by contact with the wall B of the condensing-chamber it is condensed and runs back again into the body of the pot, thus preventing the steam from the cooking contents from escaping and thereby greatly improving the quality of the coffee or tea, as it is well known, especially as regards coffee, that the aromatic element of that article consists of an essential oil which is easily volatilized by heat and moisture and thus to a great extent escapes in the steam or vapor generated in the process of cooking it.

The operation of my invention is as follows: A quantity of warm or hot water is placed, with the coffee or tea to be cooked, in the body of the pot and the chamber $A'$ is filled up to the bottom of the opening $b$ in the wall thereof with cold water and the cover C is put on, so that said opening $b$ will be closed thereby, and the pot is then put on the stove to be cooked. When the cooking is completed, the water in the condensing-chamber A' is first poured off, and the cover C is then rotated to bring the opening $d$ therein opposite the opening $b$ and the contents of the coffee-pot can be poured out.

Having thus described my invention, what I claim, and desire to secure by Letters Patent, is—

1. A coffee or tea pot consisting of the body A, the upper portion of which has double walls constituting the annular condensing-chamber A', a spout communicating with said chamber, an opening in the inner wall of the latter between said spout and the interior of the body A, a cover C, for the latter, a rim C', on said cover extending into the body A, of the pot, and temporarily closing said opening in the inner wall of said condensing-chamber, substantially as described.

2. A coffee or tea pot consisting of the body A, the upper portion of which has double walls constituting the annular condensing-chamber A', a cover C, for said body part A, having a rim thereon extending into said body part to, and near the bottom of said chamber A', a spout on said body communicating with said condensing-chamber, an opening $b$ from said spout through the wall of said chamber to the interior of the body which opening is temporarily closed by the rim of said cover, and a strainer-opening $d$, in the latter, substantially as described.

DAVID J. FIELD.

Witnesses:
H. A. CHAPIN,
K. I. CLEMONS.